(12) United States Patent
Abatie (10) Patent No.: US 10,967,582 B1
(45) Date of Patent: Apr. 6, 2021

(54) OPTIMIZED PIPE HANDLING SYSTEM WITH QUICK LOADER ARM

(71) Applicant: Gajeske, Inc., Houston, TX (US)

(72) Inventor: Chad Abatie, Prosper, TX (US)

(73) Assignee: Gajeske, Inc., Houston, TX (US)

( * ) Notice: Subject to any disclaimer, the term of this patent is extended or adjusted under 35 U.S.C. 154(b) by 0 days.

(21) Appl. No.: 16/732,675

(22) Filed: Jan. 2, 2020

(51) Int. Cl.
| | |
|---|---|
| *B29C 65/02* | (2006.01) |
| *B29C 65/20* | (2006.01) |
| *B29C 65/78* | (2006.01) |
| *F16L 1/06* | (2006.01) |
| *B29C 65/00* | (2006.01) |
| *B29L 23/00* | (2006.01) |

(52) U.S. Cl.
CPC .......... *B29C 66/5221* (2013.01); *B29C 65/02* (2013.01); *B29C 65/20* (2013.01); *B29C 65/7802* (2013.01); *B29C 65/7841* (2013.01); *B29C 66/1142* (2013.01); *B29C 66/73921* (2013.01); *B29C 66/86521* (2013.01); *F16L 1/065* (2013.01); *B29L 2023/22* (2013.01)

(58) Field of Classification Search
CPC ..... B29C 65/02; B29C 65/20; B29C 65/2092; B29C 65/7802; B29C 65/7841; B29C 66/1142; B29C 66/5221; B29C 66/73921; B29C 66/86521; B29L 2023/22; F16L 1/024; F16L 1/06; F16L 1/065; F16L 1/09; F16L 1/10
See application file for complete search history.

(56) References Cited

U.S. PATENT DOCUMENTS

| | | |
|---|---|---|
| 4,990,209 A | 2/1991 | Rakes |
| 6,212,748 B1 | 4/2001 | Porter et al. |
| 7,926,534 B2 | 4/2011 | Temple |
| 9,394,106 B2 | 7/2016 | Lyon et al. |
| 9,415,542 B2 | 8/2016 | Montgomery |
| 9,458,949 B2 | 10/2016 | McKinley |
| 10,369,751 B2 | 8/2019 | Lawrence et al. |

OTHER PUBLICATIONS

Fast Fusion. YouTube: "Fast Fusion—Mobile Automated Polyethylene Pipe Fusion", Published Jul. 3, 2013. https://www.youtube.com/watch?v=2lhFY6dCeME. Screen shots taken by the examiner. (Year: 2013).*

* cited by examiner

*Primary Examiner* — Michael A Tolin
(74) *Attorney, Agent, or Firm* — Whitaker Chalk Swindle & Schwartz PLLC; Charles D. Gunter, Jr.

(57) ABSTRACT

A method is shown for fusing sections of thermoplastic pipe together to construct continuous pipelines. A pipe loader arm is provided which can be attached to the mobile sub-frame of any number of commercially available fusion machines. The pipe loader arm scoops up and loads a new section of thermoplastic pipe to be fused into the fusion machine by feeding the pipe in an axial direction, rather than lifting the new section of pipe with a crane and vertically feeding it into the fusion machine. An exit-end support can be used to gradually lower the growing pipeline to the ground after the fusion step. The method described herein greatly reduces the time and increases the ease in which sections of pipe are fused to grow pipelines, while additionally making the process safer and protecting newly-made pipe joints from rough handling.

10 Claims, 5 Drawing Sheets

OPTIMIZED PIPE HANDLING SYSTEM WITH QUICK LOADER ARM

BACKGROUND OF THE INVENTION

1. Field of the Invention

The present invention relates generally to the field of thermoplastic pipeline construction and, more specifically, to a method for fusing sections of thermoplastic pipe to form such a pipeline using a fusing machine equipped with an auxiliary pipe loading arm which loads the sections of pipe to be fused into the fusing machine axially as opposed to vertically.

2. Description of the Prior Art

Various industries utilize thermoplastic pipelines, such as polyethylene pipe, to transport fluids across great distances. A thermoplastic pipeline is typically provided to the jobsite in multiple smaller and more manageable pieces to allow for easier transport and installation. These smaller pieces are then joined together, as by fusing the pipe ends, to create a continuous pipeline.

The fusing operation is carried out using a fusion machine. Such fusion machines are widely used in the industry and enable the welding of joints between sections of such plastic pipe. Fusion machines of this general type are available from a number of commercial suppliers, including Gajeske™, Ritmo™, WorldPoly™, Smart-Joint™, Dixon™, Georg-Fisher™, WIDOS™, McElroy™, Aquafusion™ and ROWELD™, to name a few. Individual sections of pipe must be loaded into a fusion machine to be aligned, faced, fused, with another section of pipe and then allowed to cool to form a fused pipe joint. Fusion machines are often disposed on top of movable sub-frames that enable the fusion machine to progress down the growing pipeline. The fusion machines which are carried on top of the mobile sub-frames can be drug with heavy equipment or manpower, or may be self-powered. The traditional mobile sub-frames enable the fusion machine to more easily progress down the pipeline but do not typically house a driver or within the sub-frame itself.

These fusion machines have a hot-plate welder located in the approximate center of the machine and two or more sets of pipe holding clamps. One set of clamps, the non-movable clamps, are located on the rear of the machine and secure the section of pipe already fused to the growing pipeline. The other set of clamps, the movable clamps, are located at the front of the machine. The movable claimps open up to allow a new section of pipe to be loaded into the fusion carriage.

In the past, the long sections of thermoplastic pipe were lifted up and then lowered into the fusion machine vertically to the approximate position at which facing and fusion could occur in the fusion carriage. This lifting operation required a crane device, a crane operator, and one or two pipe-sling-handling crewmen. Proper loading requires that the end of the pipe to be fused be parallel enough with the ground for the movable clamps to align the end of the pipe with the end of the growing pipeline. Loading a single section of pipe into a fusion machine can take on the order of eighteen minutes or more, on average. The crane and its crew (other than the fusion operator) sit idle as the thermoplastic pipe is faced, fused, and cooled. This fusion process must be repeated numerous times in the construction of a pipeline. Each subsequent joint must be fused to form a welded joint, with the joined sections of pipe ultimately forming a continuous pressure pipeline which is useful, for example, for the conveyance of fluids. The time that the crane crew sits idle represents lost efficiency and, along with other costs that accompany longer construction periods, increases the overall cost of the construction project at hand.

Another issue with this traditional usage of fusion machines is the "rough" handling of hot fusion joints. Once two hot ends of pipe are pushed together, the newly-formed joint must be allowed to cool, and every minute of cooling time is a minute that the crew sits idle and a minute added to the construction time. Ignoring the cooling time and handling a joint roughly could compromise the structural integrity of the joint, i.e. the joint could yield or droop under too much stressor strain, such as when the fusion machine progresses to the next section of pipe. During this time period, the newly formed joint bears the strain caused by the height differential between the pipeline portion on the ground and the pipeline portion on the fusion machine. Crews have to balance these cooling times with the need for fast construction as quotas are often measured in mileage of pipeline per day. One advancement in the industry over the previously described traditional fusing machine was the introduction of the "Fast-Fusion™" technology available from Fast Fusion LLC, of Paliside, Colo., and its distributors. The Fast Fusion™ technology uses a dedicated machine with an enclosed cab and chilled air to decrease the perceived cooling time during the fusion weld process. The actual Fast Fusion™ machine is a piece of heavy machinery that requires a driver or operator within the cab of the machine to maneuver, pick up pipe sections, and fuse the pipe sections, with control mechanisms similar to that of an excavator or bull dozer. Fast Fusion™ machines utilze a powered conveyer to grab the pipe from the ground and convey it into the fusion cab and fusion machine.

The powered conveyer comprises a roller track with two mechanical arms attached to the front of the conveyer that open like a set of jaws, with cone-shaped teeth attached to the interior of the arms. The jaws are opened sideways upon approach to a pipe section and close around the sides of the pipe section. The cone-shaped teeth force the section upwards onto the top of the closed jaws and into the roller track, allowing the machine to progress forward and feed the pipe section into the closed cab via the roller track. The powered conveyer is long enough to load a pipe section without any other lifting means, i.e. enough of a given pipe section is supported by the powered conveyer that the clamps of the fusion machine which are located within the enclosed cab, are able to align the end of the pipe with the growing pipeline. Often times, the powerer conveyer is long enough to lift an entire pipe section off of the ground and balance it on the conveyer. The conveyer is additionally permanently attached to a given Fast Fusion™ machine and is not intended to be adaptable to other fusion machines. It is an independently powered component of the heavy machinery, not receiving power or pressure from the fusion machine housed within the cab.

The focus of Fast Fusion™ technology is on its ability to cool newly-formed pipe joints faster with automated cooling technology within the close cab. However, the cooling is material-property limited, and rough handling of joints can still occur. While Fast Fusion™ allows for all-weather fusion within a closed cab and a decrease in crew numbers, the cost of the machine is prohibitive for many potential owners. Due due to the high cost of such complex equipment, many plastic pipe fusion companies cannot afford this type of machinery. Additionally. Fast Fusion™ machines are very heavy, requiring a permitted load on highways. Since the machines are also complex, any break down involves obtaining replacement parts which can sometimes take weeks.

Because of these issues with Fast Fusion™, most pipeline installers continue to use regular fusion machines to fuse lengths of plastic piping. However, as discussed above, there are issues inherent in the traditional method of using fusion machines that highlight a need for a more efficient, simple, and cost-effective ways to quickly and efficiently fuse sections ofpipe in the pipeline construction industry without cost-prohibitive and heavy machinery.

Thus, even though various advances have been made in the arts relating to thermoplastic pipeline construction, a need continues to exist for further improvements in pipeline fusion which would reduce the cost and the complexity of such operations while also minimizing potentially damaging stress and strain factors on the pipe sections being fused.

SUMMARY OF THE INVENTION

It is one of the main objects of the present invention to provide a method for fusing sections of pipe using a fusion machine, which method can be used with any of a number of commercially available fusion machines.

It is a further object of the present invention to provide a method for fusing sections of thermoplastic pipe that avoids rough handling of newly-made joints.

A further object of the present invention includes a method of fusing thermoplastic pipe joints that allows faster progression down the pipeline, decreasing the average time of the pipe loading process to as little as two minutes.

Another object of the invention is to provide a method for fusing sections of thermoplastic pipe wherein the sections of pipe are loaded into the fusion machine axially as opposed to vertically, thereby decreasing the difficulty of and time required for vertically loading pipe sections into the fusion machine while also minimizing potentially damaging stress, strain and friction factors.

In its simplest form, the inventive method comprises a step of loading a section of thermoplastic pipe into a fusion machine equipped with a special pipe loader arm. The pipe loader arm is equipped with a mechanical raising mechanism for raising and positioning the pipe end of one section of thermoplastic pipe to be fused. In a subsequent step, the fusion machine is then used to fuse the pipe section with another pipe section already in the fusion machine to make a section of fused pipeline. Thereafter, the fusion machine is progressed forward to yet another section of pipe to be fused to the remaining, non-fused end of the section of pipe just fused to the pipeline.

In one preferred form of the invention, the section ofpipe already in the fusion machine is supported by the fusion machine but also by a special exit-end support as the section of pipe exits the fusion machine. The fusion machine and attached exit-end support are progressed forward to yet another section of pipe which is to be fused to the remaining, non-fused end of said first section of pipe.

In its most preferred form, the inventive method is used for fusing a first and second sections of thermoplastic pipe to form a growing thermoplastic pipeline using a pipe fusion machine which has a fusion apparatus supported on a mobile sub-frame. The fusion apparatus has a heating element, at least one set of non-movable clamping arms for clamping a first section of pipe already loaded in the fusion machine and at least one set of movable clamping arms for clamping a new section of thermoplastic pipe in position to be fused to the previously loaded section of thermoplastic pipe already present in the fusion machine. The method includes the steps of:

providing a pipe loader arm having a first end equipped with pipe receiving surfaces and an opposite, hinged connecting end, the pipe loader arm also being equipped with a pipe raising mechanism;

attaching the hinged connecting end of the pipe loader arm to the mobile sub-frame of the fusion machine thereby forming a hinged connection between the two;

hingedly connecting the pipe raising mechanism between the pipe loader arm and the mobile sub-frame of the fusion machine, whereby actuating the pipe raising mechanism causes the loader arm to move between an unloaded position and a pipe loading positon;

moving the mobile carriage and movable clamping arms of the fusion machine in a forward direction toward a second section of pipe to be fused, the second section of pipe having a leading end and a trailing end;

actuating the pipe raising mechanism of the pipe loader arm so that the arm is lowered to the pipe loading position and moving the fusion machine and mobile sub-frame forward to scoop up the leading end of the second section of pipe as the trailing end of the second section of pipe is held immovable;

using a pipe leveling device to level the second section of pipe parallel to the ground as the second section of pipe is received within the movable clamping arms of the fusion machine while the pipe loader arm is used to align the second section of pipe with the first section of pipe;

closing the movable clamping arms of the fusion machine once the second section of pipe is aligned with the first section of pipe;

fusing said first section of pipe to the second section of pipe to make a fused pipeline joint; and progressing the mobile sub-frame with its fusion machine forward to a third section of pipe to be fused to the remaining, non-fused trailing end of the second pipe section.

The pipe loader arm extends from the mobile sub-frame of the fusion machine downwardly at an angle to the center lines of the clamping arms of the fusion machine when in the lowered, pipe loading position. Actuating the pipe raising mechanism causes the pipe loader arm to move in an arcuate fashion between the lowered position and a range of raised positions. The pipe raising mechanism can conveniently comprise a hydraulic piston/cylinder which is hingedly connected between the loading arm and the mobile sub-frame of the fusion machine.

The pipe leveling device is a mechanically operable device equipped with lifting arms which are used to level the second section of pipe by moving the lifting arms of the device to a position perpendicular to a horizontal axis of the second section of pipe near the trailing end thereof, away from the fusion machine, and lifting the second pipe section until it is approximately parallel to the ground. The pipe leveling device can also be used to assist in initially hold the second pipe section immobile as the loader arm scoops up the leading pipe end.

In the most preferred form of the inventive method, an exit-end support is removably attached to the mobile sub-frame of the fusion machine to allow a section of fused pipeline to exit the fusion machine at an elevated position relative to the ground as the fusion machine and attached exit-end support move axially in an opposite direction along a growing pipeline. In this way, the fused section of pipe is lowered to the ground following a natural curve between the exit-end support and the ground as the fused pipeline exits the exit-end support. The exit-end support can conveniently be made up of a base member and an upwardly extending frame member which terminates in a pipe receiving cradle designed to laterally stabilize a section of pipe to be fused while allowing the section of pipe to slide through the cradle during the fusing operation.

The centerline entrance and exit of the thermoplastic pipe from the fusion machine and the use of the exit-end support help to minimize any adverse handling effects or severe bending strain on a warm fused joint while also reducing potentially damaging drag and tangential loading on the fused pipe joint.

Additional objects, features and advantages will be apparent in the written description which follows.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The figures are used as non-limiting examples, only intended to portray preferred embodiments without limiting the scope of this disclosure.

DETAILED DESCRIPTION OF THE INVENTION

The preferred version of the invention presented in the following written description and the various features and advantageous details thereof are explained more fully with reference to the non-limiting examples included and as detailed in the description which follows. Descriptions of well-known components and processes and manufacturing techniques are omitted so as to not unnecessarily obscure the principal features of the invention as described herein. The examples used in the description which follows are intended merely to facilitate an understanding of ways in which the invention may be practiced and to further enable those skilled in the art to practice the invention. Accordingly, the examples should not be construed as limiting the scope of the claimed invention.

As has been briefly discussed, thermoplastic pipelines are used in a myriad of industries to transport fluids, including oil, gas, water, and sewage. Thermoplastic pipelines are often constructed at a job site from individual sections of pipe which are then fused together on site. Fusion machines of the type used to fuse sections of thermoplastic pipe together are available from a number of different commercial suppliers, such as those previously mentioned. However, as briefly discussed, there are hardships in both loading pipes into the traditional fusion machines and in protecting newly-made joints from rough handling. The present invention addresses these issues by providing a faster, cheaper, and easier way of fusing sections of thermoplastic pipe than is possible using the technology which makes up the currently known state of the art.

Figure 1:
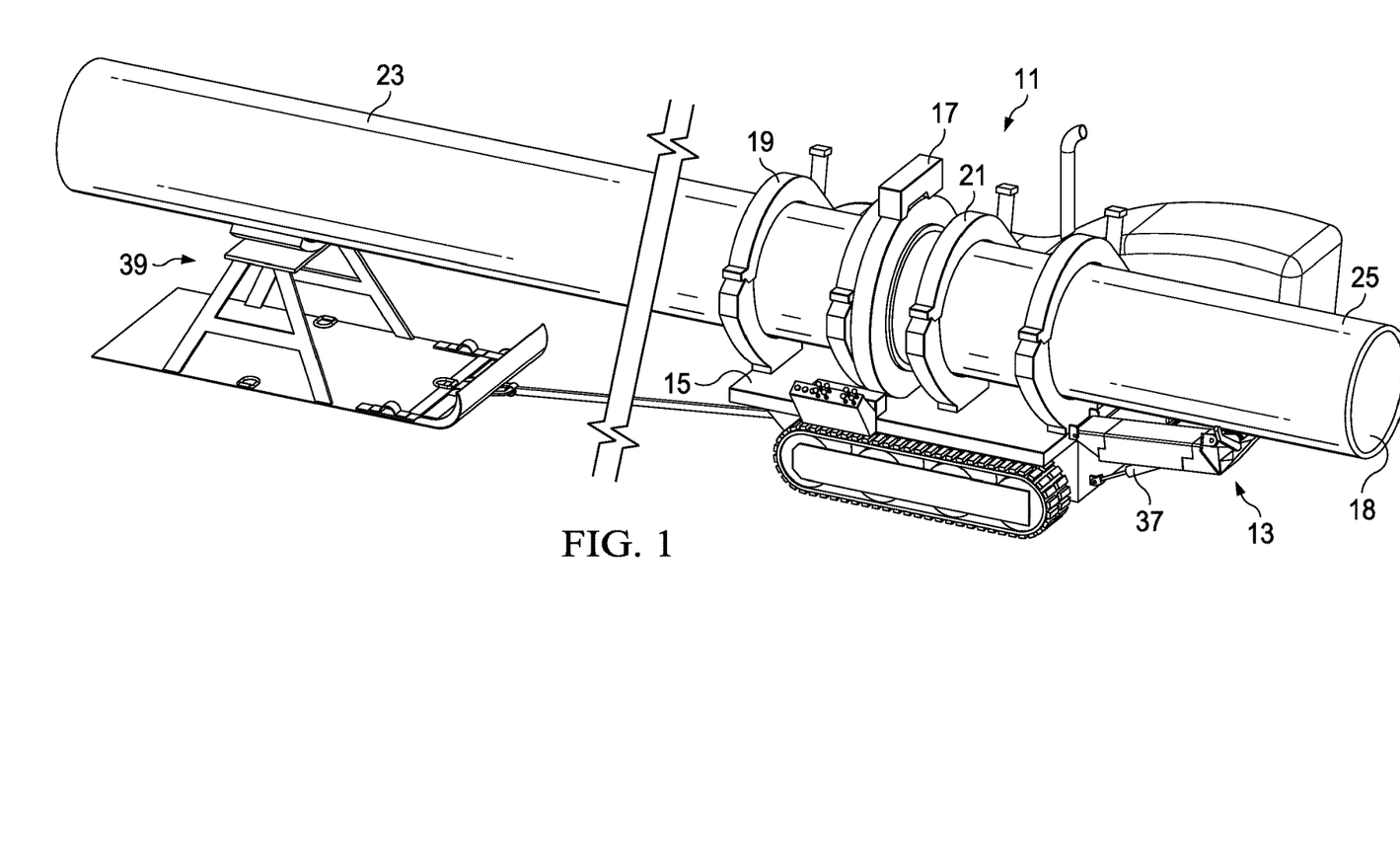
FIG. 1 is a perspective view of the equipment used in the practice of the method of the invention to fuse sections of thermoplastic pipe to form a continuous pipeline.

Turning now to FIG. 1, there is shown a commercially available fusion machine, designated generally as 11 which has been modified by the addition of a special pipe loading arm, designated generally as 13. In the example shown, the fusion machine 11 happens to a McElroy T900™ manufactured by McElroy of Tulsa, Okla. However, it could be any of a number of fusion machines, such as the previously listed, commercially available machines. The fusion machine shown in FIG. 1 is illustrated in simplified fashion but will be understood by those skilled in the art to include at least a fusion apparatus mounted mobile sub-frame 15. The fusion apparatus includes at least a heated fusing section 17, a set of immovable clamp arms 19 and a set of movable clamp arms 21. The clamp arms are used to hold the two sections of pipe to be fused in position generally aligned along a centerline (18 in FIGS. 1 and 4A) which also coincides with the longitudinal axis of the two pipes in the aligned position.

These components of the fusion machine described thus far all work in the known manner. That is, a first section of pipe 23 is held in the first clamp arms 19. A second section of pipe 25 is moved into position in the fusion apparatus. A heater plate included as part of the fusing section 17 is moved into position to fuse the two abutting pipe ends. However, as has been described, in the prior art method of assembling a pipeline, the second section of pipe 25 was typically moved into position by using a heavy piece of equipment such as a crane. The section of pipe was thus vertically picked up and loaded into the frame of the fusion machine. This generally required the presence of at least two additional crane crew members. The crew members sat idle while the actual fusion operation was occurring.

Figure 2:
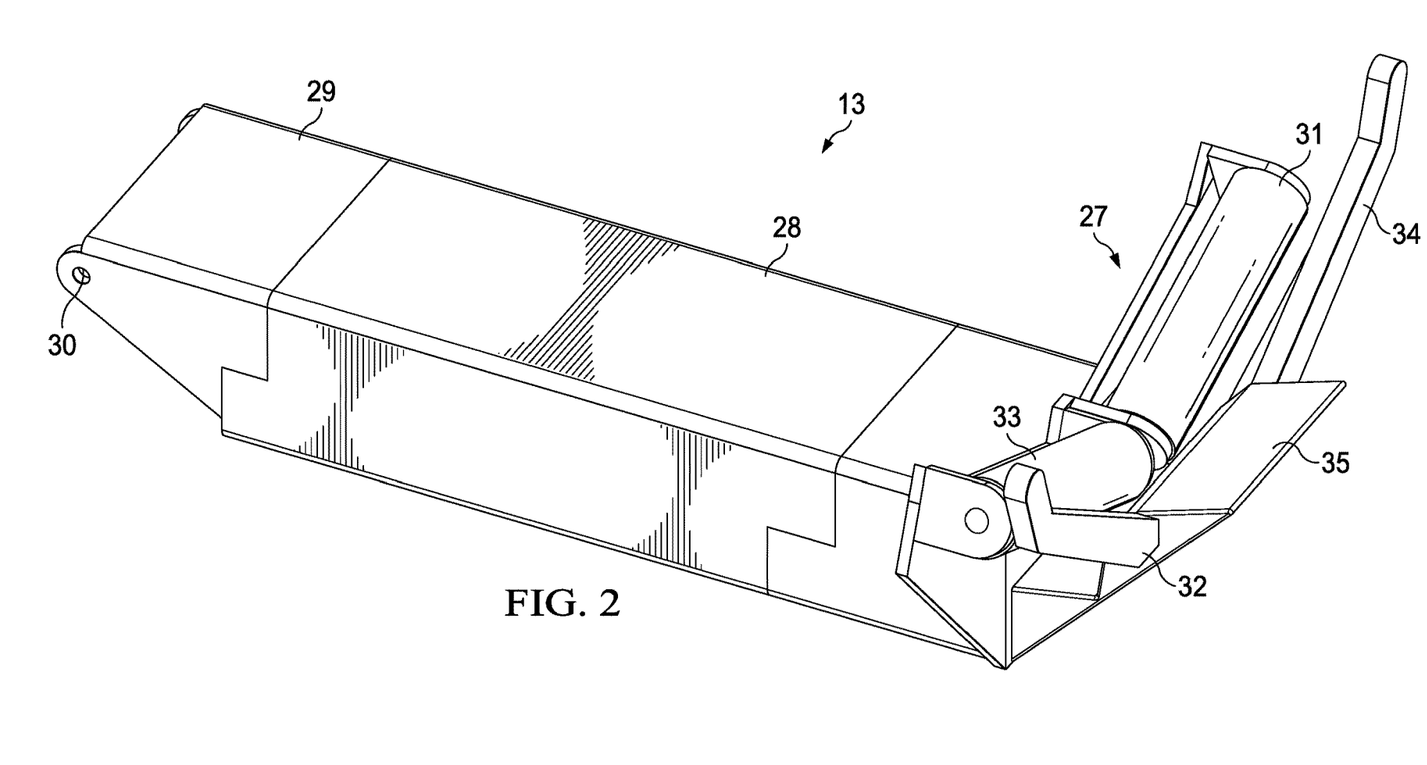
FIG. 2 is an isolated, perspective view of the pipe loader arm of the invention which is adapted to be attached to any of a number of commercial fusion machines.

The present inventive method differs from the prior art practice by incorporating the special pipe loader arm shown as 13 in FIG. 1 and in greater detail in FIG. 2. With reference to FIG. 2, the pipe loader arm has a first end equipped with pipe receiving surfaces 27, an intermediate length 28, and an opposite, hinged connecting end 29. The hinged connecting end attaches the pipe loader arm to the mobile sub-frame 15 of the fusion machine at a pivot point 30, thereby forming a hinged connection between the two. In the preferred form shown in FIG. 2, the pipe receiving surfaces include a single pair of rollers 31, 33, and a pipe containment structure which, in the preferred form shown, is a pair of fixed metal bars 32, 34. The fixed metal bars 32, 24, create a V-shaped opening for receiving the leading end of the second pipe section to be fused. The pipe loader arm also has a tapered head made up in part by a chisel-shaped nose region 35 for picking up a next section of pipe to be fused.

Any type of securing means may be used instead of the V-shape, including, but not limited to, straps, bars of different shapes, or the tapered head could be configured to incorporate a securing means of its own, such as if the tapered head were configured as a "scoop" to match or compliment the curvature of the section of pipe to be lifted. In the case of the loader arm 13 shown in FIG. 2, the tapered head allows the pipe loader arm 13 to wedge between the ground and the end of a section of pipe to be loaded.

The rollers 31, 33 are sized and positioned dependent primarily upon the size (diameter) of the thermoplastic pipe being loaded. In the preferred form of the practice of the invention, the rollers 31, 33, (FIG. 2) are non-powered (free-wheeling). Powered rollers within or on the loader arm could also be used to assist in driving the section of pipe forward on its own, or in concert with axial forces imparted to the pipe. However, as will be explained more fully, the primary forces being imparted to the second section of pipe being loaded comes from the movement of the mobile sub-frame of the fusion machine which, in turn, causes the pipe receiving surfaces of the loader arm to move along the longitudinal axis of the second section of pipe being loaded. There is no complicated powered conveyor and roller track, as is used in the Fast Fusion™ apparatus.

The pipe loader arm 13 also has a pipe raising mechanism which, in the embodiment of the invention shown in FIG. 1, is a hydraulic piston/cylinder 37. However, it will be appreciated by those skilled in the art that any mechanical mechanism that enables mechanical raising may be used instead of a hydraulic piston/cylinder including but not limited to a wire-rope winch, chain and sprocket, or a geared device. The pipe raising mechanism is hingedly connected, as shown, between the pipe loader arm 13 and the mobile sub-frame 15 of the fusion machine, whereby actuating the pipe raising mechanism 37 causes the loader arm 13 to move between an unloaded position with the nose region 35 pointed to the ground and the loaded pipe positon shown in FIG. 1. The pipe loader arm thus extends from the mobile sub-frame of the fusion machine downwardly at an angle to the center lines 18 of the clamping arms of the fusion machine when in a lowered, pipe loading position. Actuating the pipe raising mechanism causes the pipe loader arm to move in an arcuate fashion between the lowered position and a range of raised positions. The hydraulic piston/cylinder could take its power (pressure and directional flow), for example, from the fusion machine 11 or from a separate source on the mobile sub-frame 15.

Figure 3:
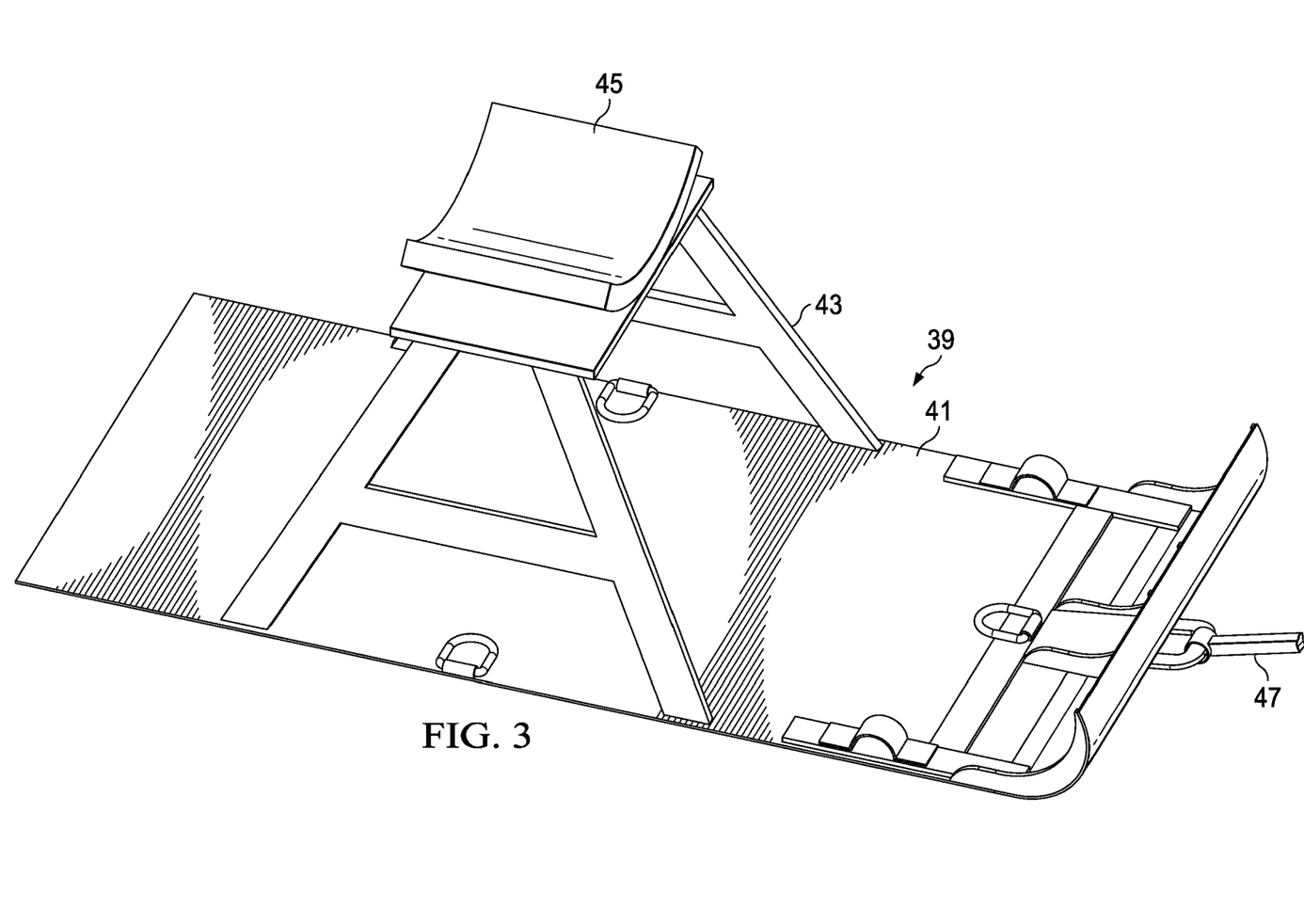
FIG. 3 is an isolated perspective view of the exit-end support device used in the practice of the invention, the device also being adaptable to any number of commercial fusion machines.
Figure 4A:
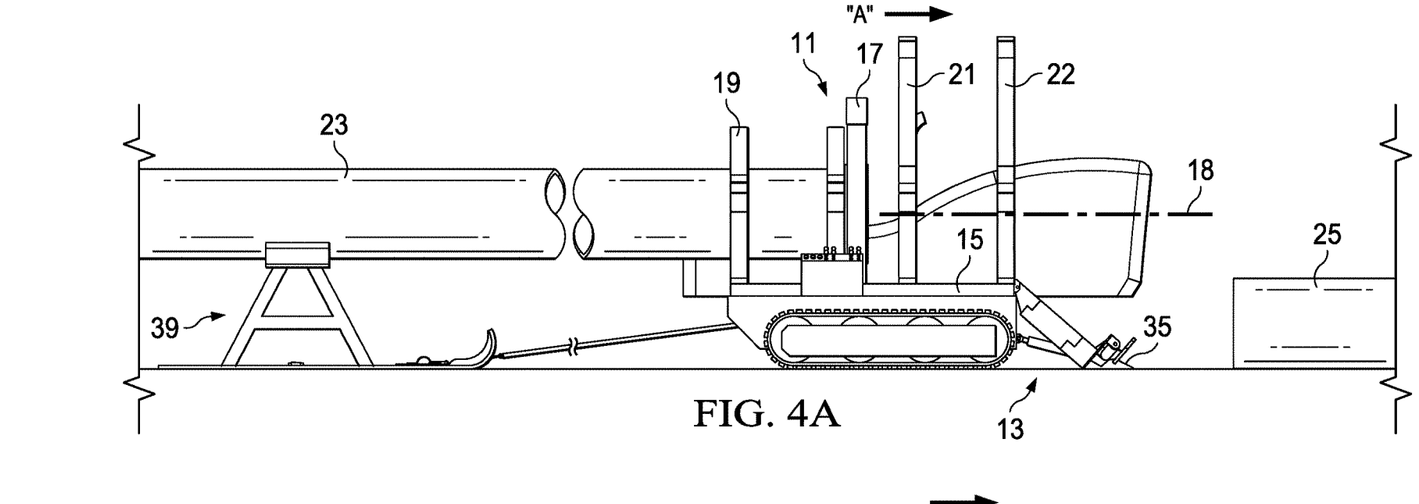
FIGS. 4A-4D show the various different sequential steps used in the practice of the method of the invention in forming a completed fused thermoplastic pipeline, as will be described more fully in the written description which follows.
Figure 4B:
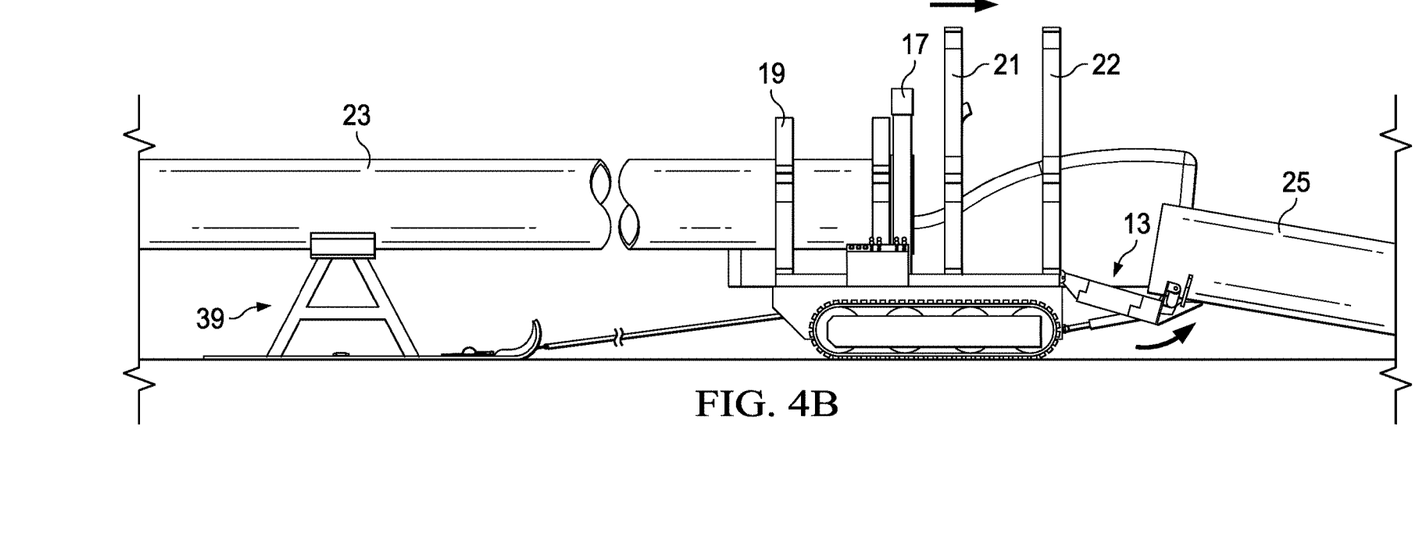
Figure 4C:
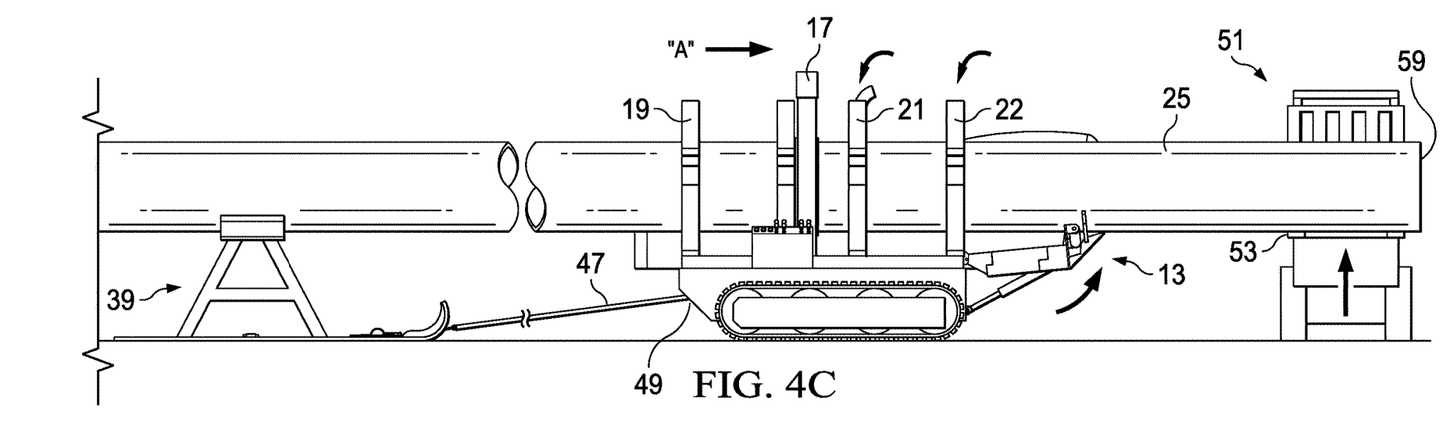
Figure 4D:
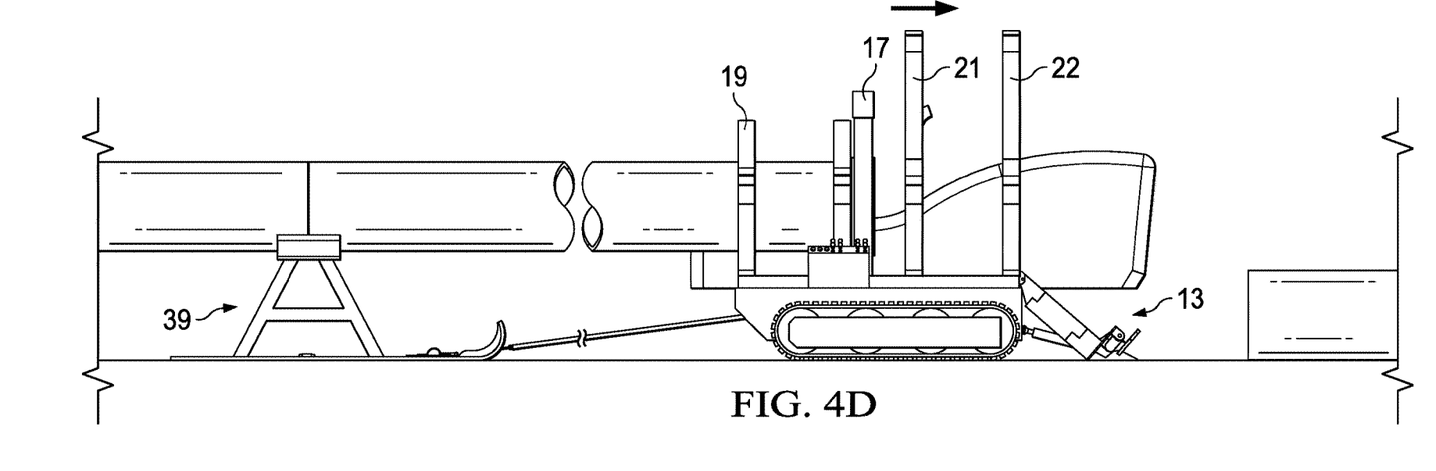

As shown in FIGS. 3 and 4C and 4D, the method of the invention also makes use of an an exit-end support 39 which is removably attached to the mobile sub carriage of the fusion machine 11 to allow a section of fused pipeline to exit the fusion machine at an elevated position relative to the ground as the fusion machine 11 and attached exit-end support 39 move axially in an opposite direction along a growing pipeline (see FIGS. 4A-4D). In this way, the fused section of pipe lowers to the ground following a natural curve between the exit-end support 39 and the ground as the fused pipeline exits the exit-end support. As best seen in FIG. 3, the exit-end support device 39 includes a base member 41 and an upwardly extending frame member 43 which terminates in a pipe receiving cradle 45 designed to laterally stabilize a section of pipe to be fused while allowing the section of pipe to slide through the cradle 45 during the fusing operation.

At least one connector member 47 is removably attached to the base member 41 on one end and removably attached to the mobile sub-frame of the fusion machine at an opposite end (49 in FIG. 4C). The connector member serves to maintain the exit-end support device 39 at a fixed distance from the fusion machine as the fusion machine moves during the fusion operation. In this way, the fusion machine mobile sub-frame drags the exit-end support 39 behind the fusion machine during the fusion operation. The connector member 47 could be, for example, wire rope, metal chains, polymer fabric slings, heavy duty rope or pinned or bolted steel bars. In some cases, one connector member may be used, but two or more devices attached at the end of the mobile base and to the exit-end support might be used in some situations to keep the end-exit support centered along the axis of the fusion machine, thereby inhibiting any tendency for twisting or leaning or deviation from the path behind the fusion machine.

The base 41 may optionally be wheeled, a flat-bottom skid, equipped with pontoons, or modified in any other way that would allow the exit-end support 39 to trail behind the fusion machine 11. The frame member 43 is at an appropriate height to allow the cradle 45 to support a section of pipe at a height that is roughly equivalent to the height at which the section of pipe is supported in the fusion machine 11. The cradle 45 is designed to allow the growing pipeline to slide through it laterally as the mobile sub-frame 15 drags the exit-end support 39 along the growing pipeline. The cradle 45 is also designed to stabilize the pipeline on either side to prevent the pipeline from rolling off of the exit-end support 39. In this example shown in FIG. 3, the cradle 45 is shaped as a section of a cylinder that can partly circumscribe the section of fused pipe to prevent it from rolling off of the exit-end support 39 while still allowing the pipeline to slide through the cradle 45. The cradle 45 can be designed in any way or shape that allows it to stabilize the pipeline while simultaneously allowing the pipeline 108 to slide through the cradle.

The preferred inventive method also uses what is referred to in the discussion which follows as a "pipe leveling device" which takes the form, for example, of a skid steer fork lift. Such a fork lift is illustrated in simplified form as 51 in FIG. 4C. However, the pipe leveling device can be any mechanically operable device capable of picking up the second section of pipe at the appropriate point in the fusion operation. In the case shown. In the case shown, the skid steer fork lift 51 is equipped with lifting arms 53 which are used to level the second section of pipe 25 by moving the lifting arms of the device to a position perpendicular to a horizontal axis 18 of the second section of pipe near the trailing end thereof (away from the fusion machine) and lifting the second pipe section until it is approximately parallel to the ground.

FIGS. 4A-4D illustrate, in simplified fashion, the steps involved in the method of the invention. FIG. 4A shows the fusion machine 11 disposed on a mobile sub-frame 15 moving along the growing pipeline in the direction of the arrow "A" to the next section of pipe 25 to be fused to the growing pipeline. The non-movable clamping arms 19 are closed about the first section of pipe 23. The moveable clamp arms 21, 22, are in the open position. The end of the first section of pipe 23 to be fused is centered with respect to the heater plate 17 of the fusion section of the apparatus.

As in FIGS. 4A-4B, upon approach to the next section of pipe 25 to be fused, the pipe loader arm 37 is lowered such that the tapered head 35 is flush with the ground. The mobile sub-frame 15 (with the fusion machine 11) moves forward moving in the direction shown by the arrow "A" and the exit-end support 39 is being drug along behind the fusion machine as the fusion machine progresses forward. As shown in FIG. 4B, this causes the tapered head of the pipe loader arm 13 to be wedged underneath the pipe to be fused 25 so that the pipe is "scooped" onto the tapered head. In one embodiment, the frictional resistance between the pipe 25 and the ground is sufficient to laterally immobilize the pipe 25 while the end to be fused is scooped onto the tapered head of the loader arm 13. In another embodiment, a blocking device, such as the previously described forklift (53 in FIG. 4C) is used to immobilize the second section of pipe 25. However, other equipment, a crew, etc, (not shown) could be disposed at the end of the pipe 25 farthest from the pipe loader arm 13 such that the pipe 25 is laterally immobilized.

The blocking device may take the form of anything able to apply sufficient force to laterally immobilize the pipe 25 to be fused while the pipe loader arm 13 scoops up the end of the pipe as described above.

Once the pipe 25 is scooped up onto the tapered head of the loader arm, the containment arms (32, 34 in FIG. 2) maintain the pipe 25 on the pipe loader arm 13 while the raising means 37 lifts the end of the pipe upwards from the ground. After the pipe loader arm 13 is raised, or while the pipe loader arm 13 is in the process of being raised, the mobile sub-frame 15 progresses in the direction of the arrow "A" in FIG. 4C. The section of pipe 25 is maintained between the containment arms 32, 34, as it slides over the tapered head and over the rollers 31, 33, of the loader arm towards the fusion machine 1. Again, the primary motive force comes from the movement of the mobile sub-frame of the fusion machine 11, and not from the loader arm rollers 31, 33.

Once the pipe to be fused 25 is at an appropriate lateral position to be guided into the fusion machine 11, the lifting apparatus (here forklift 51) lifts the end 59 of the pipe farthest from the pipe loader arm 13 to suspend the section of pipe 25 roughly parallel to the ground between the fusion machine 11 and lifting apparatus 51, whereby the fusion machine 11 can act on the pipe. Once roughly parallel with the ground and aligned approximately with the centerline 18 of the fusion machine, the section of pipe 25 is able to be fused to the growing pipeline by the fusion machine 11. The fusing position of the first and second pipe sections is shown in FIG. 4C.

Any combination, in any order, of movement by the mobile sub-frame 15 and movement by the pipe loader arm 13 may be used to position the pipe to be fused at an appropriate lateral position before the lifting device 51 is used. In the manner described above, the second section of pipe 25 is loaded "axially" into the fusion machine 11, as opposed to the traditional vertical loading where a pipe would be lowered into a fusion machine from above.

Once the pipe section 25 is fused to the growing pipeline, the fusion machine 11 may progress forwards towards the next pipe to be fused (see FIGS. 4C and 4D). As the fusion machine 11 moves along the pipeline, the newly-fused pipe section 25 is supported between the fusion machine 11 and the exit-end support 39, as has been described thereby relieving strain that could be placed on the newly formed pipe joint.

An invention has been provided with several advantages. The method of the invention uses equipment that is relatively simple in design and economical to manufacture. The loading arm which is used in the practice of the invention can be adapted for use with any number of commercially available fusion machines. Using simple equipment and the techniques of the invention, thermoplastic pipe can be fused into a continuous pipeline without requiring drastic modification of the existing equipment or the purchase of vastly more expensive and exotic fusion equipment. The saved time and personnel costs which are achieved through the practice of the inventive method are considerable over existing methods presently being employed in the industry. Because the pipe sections being fused are supported at both the entrance of the fusion machine, within the fusion machine and at the end-exit point, potentially damaging stress, strain and friction forces are minimized, eliminating many of the "rough handling" characteristics which were typical of the prior art practices.

While the invention has been shown in several of its forms, it will be appreciated that it is not thus limited, but is susceptible to various changes and modifications without departing from the spirit thereof.

What is claimed is:

1. A method for fusing first and second sections of thermoplastic pipe to form a growing thermoplastic pipeline using a fusion machine for fusing thermoplastic pipe, the first section of thermoplastic pipe having been previously loaded in the fusion machine, the fusion machine comprising a fusion apparatus supported on a mobile sub-frame, the fusion apparatus comprising a heating element, at least one set of non-movable clamping arms for clamping the previously loaded first section of thermoplastic pipe and at least one set of movable clamping arms for clamping the second section of thermoplastic pipe in a position to be fused to the previously loaded first section of thermoplastic pipe, all of the clamping arms each having a common centerline, the method comprising the steps of:
   providing a pipe loader arm having a first end equipped with pipe receiving surfaces and an opposite, hinged connecting end, the pipe loader arm also being equipped with a pipe raising mechanism;
   attaching the hinged connecting end of the pipe loader arm to the mobile sub-frame of the fusion machine thereby forming a hinged connection between the two;
   hingedly connecting the pipe raising mechanism between the pipe loader arm and the mobile sub-frame of the fusion machine, whereby actuating the pipe raising mechanism causes the pipe loader arm to move between an unloaded position and a pipe loading position;
   moving the fusion machine and its mobile sub-frame in a forward axial direction toward the second section of pipe, the second section of pipe having a leading end and a trailing end;
   actuating the pipe raising mechanism of the pipe loader arm so that the pipe loader arm is lowered to the pipe loading position, moving the fusion machine and its mobile sub-frame forward to scoop up the leading end of the second section of pipe and holding the trailing end of the second section of pipe immovable;
   receiving the second section of pipe within the movable clamping arms and using a pipe leveling device to level the second section of pipe parallel to a ground surface as the second section of pipe is received within the movable clamping arms of the fusion machine while the pipe loader arm is used to align the second section of pipe with the first section of pipe;
   closing the movable clamping arms of the fusion machine once the second section of pipe is aligned with the first section of pipe;
   fusing said first section of pipe to the second section of pipe to make a fused pipeline joint; and
   progressing the mobile sub-frame with its fusion machine forward to a third section of thermoplastic pipe to be fused to the trailing end of the second section of pipe.

2. The method of claim 1, wherein the pipe loader arm extends from the mobile sub-frame of the fusion machine downwardly at an angle to the centerline of the clamping arms of the fusion machine when in the pipe loading position and wherein actuating the pipe raising mechanism causes the pipe loader arm to move in an arcuate fashion between the pipe loading position and a range of raised positions.

3. The method of claim 2, wherein the pipe raising mechanism is a hydraulic cylinder which is hingedly connected between the loading arm and the mobile sub-frame of the fusion machine.

4. The method of claim 1, wherein frictional resistance which develops between the second section of pipe and the ground surface is sufficient to laterally immobilize the second section of pipe while its leading end is scooped onto the pipe loader arm.

5. The method of claim 1, wherein the pipe leveling device is a mechanically operable device equipped with lifting arms, wherein holding the trailing end of the second section of pie comprises using the pie leveling device to hold the trailing end of the second section of pipe immobile as the pipe loader arm scoops up the leading end of the second section of pipe, the method further comprising using the pipe leveling device to level the second section of pipe by moving the lifting arms under the second section of pipe at a position near the trailing end thereof and lifting the second section of pipe until it is approximately parallel to the ground surface.

6. The method of claim 5, wherein the pipe leveling device is a skid steer fork lift.

7. The method of claim 1, further comprising removably attaching an exit-end support to the fusion machine to allow a section of fused pipeline to exit the fusion machine at an elevated position relative to the ground surface as the fusion machine and attached exit-end support move axially in an opposite direction along a growing pipeline, wherein the section of fused pipeline lowers to the ground following a natural curve between the exit-end support and the ground surface as the section of fused pipeline exits the exit-end support.

8. The method of claim 7, wherein the exit-end support comprises:
a base member, a pipe receiving cradle, and an upwardly extending frame member which terminates in the pipe receiving cradle, the pipe receiving cradle designed to laterally stabilize a section of pipe before a fusing operation and allowing the section of pipe to slide through the cradle when the fusion machine moves in the forward axial direction; and
at least one connector member removably attached to the base member on one end and removably attached to the fusion machine at an opposite end, the at least one connector member serving to maintain the exit-end support apparatus at a fixed distance from said fusion machine when the fusion machine moves in the forward axial direction.

9. The method of claim 1, wherein the pipe loader arm is equipped with a tapered, chisel-shaped nose and a containment structure, such that a pipe resting on the nose is prevented from rolling off of the pipe loader arm by the containment structure.

10. The method of claim 9, wherein the containment structure is a pair of fixed arms which create a V-shaped opening for receiving the leading end of the second section of pipe.

* * * * *